US007963665B2

(12) United States Patent
Minoda et al.

(10) Patent No.: US 7,963,665 B2
(45) Date of Patent: Jun. 21, 2011

(54) VEHICLE LIGHT AND LED PACKAGE

(75) Inventors: Takako Minoda, Tokyo (JP); Shinichi Kojima, Tokyo (JP); Hidetaka Okada, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 10 days.

(21) Appl. No.: 12/400,986

(22) Filed: Mar. 10, 2009

(65) Prior Publication Data

US 2009/0225564 A1 Sep. 10, 2009

(30) Foreign Application Priority Data

Mar. 10, 2008 (JP) ................................ 2008-059665

(51) Int. Cl.
*F21S 4/00* (2006.01)
*B60Q 1/00* (2006.01)

(52) U.S. Cl. .................. 362/231; 362/545; 362/249.02; 362/230

(58) Field of Classification Search .................. 362/510, 362/166, 230, 231, 235, 241, 249.02, 249.05, 362/545
See application file for complete search history.

(56) References Cited

U.S. PATENT DOCUMENTS

| | | | | |
|---|---|---|---|---|
| 4,677,533 | A * | 6/1987 | McDermott et al. | 362/240 |
| 5,384,519 | A * | 1/1995 | Gotoh | 315/324 |
| 5,841,177 | A * | 11/1998 | Komoto et al. | 257/431 |
| 7,302,181 | B2 * | 11/2007 | Ng et al. | 398/88 |
| 7,455,423 | B2 * | 11/2008 | Takenaka | 362/231 |
| 7,687,753 | B2 * | 3/2010 | Ashdown | 250/205 |
| 2002/0006044 | A1 * | 1/2002 | Harbers et al. | 362/555 |
| 2002/0054495 | A1 | 5/2002 | Natsume | |
| 2003/0156425 | A1 * | 8/2003 | Turnbull et al. | 362/545 |
| 2004/0201987 | A1 * | 10/2004 | Omata | 362/230 |
| 2005/0047144 | A1 * | 3/2005 | Starkweather | 362/293 |
| 2010/0060195 | A1 * | 3/2010 | Tsuboi et al. | 315/294 |

FOREIGN PATENT DOCUMENTS

| | | |
|---|---|---|
| JP | 2002093212 | 3/2002 |

* cited by examiner

*Primary Examiner* — Jong-Suk (James) Lee
*Assistant Examiner* — Peggy A. Neils
(74) *Attorney, Agent, or Firm* — Kenealy Vaidya LLP

(57) ABSTRACT

A vehicle light having a plurality of LED light sources can be configured to be capable of preventing or suppressing emission of glaring light. An LED package with a plurality of LED light emitting elements can be provided. The vehicle light can include a plurality of LED light sources emitting light with a dominant wavelength that falls within a wavelength range of light that is emitted from an incandescent bulb and which has passed through a filter with a specified color. The respective dominant wavelengths can be different from one another. The LED package can include a plurality of LED elements emitting light that has a dominant wavelength which falls within a wavelength range of light that is emitted from an incandescent bulb and which has passed through a filter with a specified color. The respective dominant wavelengths can be different from one another.

16 Claims, 6 Drawing Sheets

VEHICLE LIGHT AND LED PACKAGE

This application claims the priority benefit under 35 U.S.C. §119 of Japanese Patent Application No. 2008-059665 filed on Mar. 10, 2008, which is hereby incorporated in its entirety by reference.

BACKGROUND

1. Technical Field

The presently disclosed subject matter relates to a vehicle light and an LED package, and in particular, to a vehicle light having a plurality of LED light sources and capable of preventing or suppressing the emission of glaring light, and also to an LED package including a plurality of LED elements.

2. Description of the Related Art

LED light sources have several advantageous features including short lighting response time as compared with that of an incandescent bulb, and reduced electrical power consumption that is about one fifth, or less, the power consumption of an incandescent bulb. Recent vehicle lights tend to employ such LED light sources in place of incandescent bulbs in order to effectively utilize these advantageous features.

An example of such a vehicle light employing LED light sources is a stop lamp mounted in a rear part of a vehicle body. The stop lamp can include a plurality of LED light sources, as disclosed in Japanese Patent Application Laid-Open No. 2002-093212, for example.

SUMMARY

One problem or characteristic of conventional devices can be that the light emitted from an LED light source (including an LED package, an LED element, or the like), having a wavelength of 620 nm, for example, is more glaring than light that is emitted from an incandescent bulb and which has passed through a red color filter (for example, having a wavelength of 617 nm).

FIG. 1 is a graph illustrating the comparison between these two types of light, in which the vertical axis represents the relative spectral energy and the horizontal axis represents the wavelength. The values are normalized by the energy intensity at the peak wavelength of the LED. A first spectral energy characteristics curve $L_1$' and second spectral energy characteristics curve $L_2$' are plotted in this coordinate system. The first spectral energy characteristics curve $L_1$' is derived by multiplying the spectral energy of light emitted from an LED light source by the spectral luminous efficacy. The second spectral energy characteristics curve $L_2$' is derived by multiplying the spectral energy of light emitted from an incandescent bulb (for example, a filament bulb) and having passed through a red color filter by the spectral luminous efficacy.

With reference to FIG. 1, the peak spectral energy of $L_1$' is about twice the peak spectral energy of $L_2$', meaning that the LED light source has an emission intensity about twice the emission intensity of the incandescent bulb. Accordingly, when the same brightness is assumed, the LED light source may stimulate visual cells twice, or more, than the incandescent bulb. Therefore, the light emitted from the LED light source (emitting light, for example, having a wavelength of 620 nm) is more glaring than that emitted from an incandescent bulb and having passed through a red color filter (for example, having a wavelength of 617 nm).

This fact has been confirmed through experiments. FIG. 2 shows the respective allowable limits of glaring light intensities of LED light sources (which can emit light including wavelengths of 620 nm, 628 nm, and so on) and an incandescent bulb with a red color filter. As shown in FIG. 2, the allowable limits of glaring light intensities from the LED light sources are smaller than that of the incandescent bulb using the red color filter (for example, having a wavelength of 617 nm). The light emitted from the LED light source having a wavelength of 620 nm or 628 nm is more glaring than light that is emitted from the incandescent bulb and has passed through the red color filter (for example, having a wavelength of 617 nm). Also, FIG. 2 shows the allowable limits of glaring light intensities of LED light sources that can emit light including wavelengths of blue, green, amber, and blue with yellow phosphor. In these cases, the light emitted therefrom is also more glaring than light that from the incandescent bulb with the red color filter.

The presently disclosed subject matter was devised in view of these and other characteristics, features, and problems and in association with the conventional art. An aspect thereof is to provide a vehicle light including a plurality of LED light sources and capable of preventing or suppressing the emission of glaring light.

According to an aspect of the presently disclosed subject matter, a vehicle light can include a plurality of LED light sources including at least two LED light sources having mutually different dominant wavelengths. In this configuration, the different dominant wavelengths can fall within a predetermined wavelength range of light that is emitted from a white light source using a filament for use in a general-purpose vehicle light and is wavelength converted by passing through a filter with a specified color serving as a function color for a specified lighting device.

Furthermore, in the vehicle light according to the previous aspect, the wavelength range wavelength converted by the specified filter can be in a range of from 600 nm to 700 nm. Another particular range can be from 600 nm to 650 nm, and another particular range can be from 610 nm to 630 nm.

In particular, according to an aspect of the presently disclosed subject matter, a vehicle light can include a plurality of LED light sources emitting light of which a dominant wavelength falls within a wavelength range of light that is emitted from an incandescent bulb and has passed through a filter with a specified color, and the respective dominant wavelengths are different from one another.

By using the vehicle light according to the presently disclosed subject matter, spectral energy characteristics that are derived by multiplying the spectral energy of light emitted from the plurality of LED light sources by the spectral luminous efficacy can be matched to, or can be approximated to, the spectral energy characteristic that is derived by multiplying the spectral energy of light emitted from the incandescent bulb and passed through the filter with the specified color (for example, a red color filter) by the spectral luminous efficacy.

Accordingly, the vehicle light of the presently disclosed subject matter can reproduce spectrum that is the same as, or similar to, that of the conventional incandescent bulb, by means of the plurality of LED light sources. This configuration can achieve a vehicle light including a plurality of LED light sources and capable of preventing or suppressing the emission of glaring light more than the conventional vehicle light that uses a plurality of LED light sources, each emitting light with the same dominant wavelength.

According to another aspect of the presently disclosed subject matter, the vehicle light can further include a controller configured to control respective outputs of the plurality of LED light sources.

The controller can control the outputs of the plurality of LED light sources, for example, so that the spectral energy characteristics that are derived by multiplying the spectral energy of light emitted from the plurality of LED light sources by the spectral luminous efficacy can be matched to, or be approximated to, the spectral energy characteristic that is derived by multiplying the spectral energy of light emitted from an incandescent bulb and passed through a filter with a specified color (for example, a red color filter) by the spectral luminous efficacy. Accordingly, the vehicle light of the presently disclosed subject matter can reproduce spectrum, that is the same as, or similar to, that of the conventional incandescent bulb, by means of the plurality of LED light sources, thereby preventing or suppressing the emission of glaring light.

According to still another aspect of the presently disclosed subject matter a vehicle light can include a controller that can control the outputs of the plurality of LED light sources so that the spectral energy characteristics that are derived by multiplying the spectral energy of light emitted from the plurality of LED light sources by the spectral luminous efficacy can be matched to the spectral energy characteristic that is derived by multiplying the spectral energy of light emitted from an incandescent bulb and passing through a filter with a specified color (for example, a red color filter) by the spectral luminous efficacy.

The controller can control the outputs of the plurality of LED light sources so that the spectral energy characteristics that are derived by multiplying the spectral energy of light emitted from the plurality of LED light sources by the spectral luminous efficacy can be matched to the spectral energy characteristic that is derived by multiplying the spectral energy of light emitted from an incandescent bulb and passing through a filter with a specified color (for example, a red color filter) by the spectral luminous efficacy. Accordingly, the vehicle light of the presently disclosed subject matter can reproduce spectrum, that is the same as, or similar to, that of the conventional incandescent bulb, by means of the plurality of LED light sources, thereby preventing or suppressing the emission of glaring light.

In another aspect of the presently disclosed subject matter, the plurality of LED light sources can be arranged at regular intervals of 15 mm or less.

Accordingly, the vehicle light of the presently disclosed subject matter can have the plurality of LED light sources arranged at regular intervals of 15 mm or less, thereby preventing or suppressing the emission of glaring light more effectively than the conventional vehicle light.

According to still another aspect of the presently disclosed subject matter, in the vehicle light of the previous aspect the LED light sources can include a reflector configured to reflect light emitted from the plurality of LED light sources in order to uniformly emit the light.

Accordingly, the vehicle light of the presently disclosed subject matter can have the reflector configured to reflect light emitted from the plurality of LED light sources in order to uniformly emit the light, thereby preventing or suppressing the emission of glaring light more effectively than the conventional vehicle light.

According to still another aspect of the presently disclosed subject matter, the LED light sources can include a lens configured to diffuse at least part of light emitted from the plurality of LED light sources.

Accordingly, the vehicle light of the presently disclosed subject matter can have the lens configured to diffuse at least part of light emitted from the plurality of LED light sources, thereby preventing or suppressing the emission of glaring light more effectively than the conventional vehicle light.

According to still another aspect of the presently disclosed subject matter, the specified lighting device can be any of a stop light and a direction indicator light (i.e., a turn signal). In this case, the vehicle light can sufficiently exert the advantageous effects thereof.

According to still another aspect of the presently disclosed subject matter, an LED package can include a plurality of LED elements emitting light of which a dominant wavelength falls within a wavelength range of light that is emitted from an incandescent bulb and has passed through a filter with a specified color, where the respective dominant wavelengths are different from one another.

By using the LED package according to the presently disclosed subject matter, spectral energy characteristics that are derived by multiplying the spectral energy of light emitted from the plurality of LED light sources by the spectral luminous efficacy can be matched to or be approximated to the spectral energy characteristic that is derived by multiplying the spectral energy of light emitted from an incandescent bulb and passing through a filter with a specified color (for example, a red color filter) by the spectral luminous efficacy.

Accordingly, the LED package of the presently disclosed subject matter can reproduce spectrum, that is the same as, or similar to, that of the conventional incandescent bulb, by means of the plurality of LED elements. This configuration can achieve an LED package including a plurality of LED elements and capable of preventing or suppressing the emission of glaring light more than the conventional LED package including a plurality of LED elements emitting light of which dominant wavelengths are the same.

According to still another aspect of the presently disclosed subject matter, a vehicle light can include a plurality of LED light sources including at least two LED light sources having mutually different dominant wavelengths, and in this configuration one of the two LED light sources with the adjacent different dominant wavelengths can have a high relative spectral energy distribution with a maximum energy intensity, and the other LED light source can have a low relative spectral energy distribution that overlaps with the high relative spectral energy distribution crossing at a point where an energy intensity thereof is 50% the maximum energy intensity, or lower. In this manner wherein the respective lower areas overlap each other at a certain energy intensity level, the resulting light from the vehicle light can have the same level of glaring as that of light from an incandescent bulb with a specified filter.

The presently disclosed subject matter can provide a vehicle light including a plurality of LED light sources and capable of preventing or suppressing the emission of glaring light as well as an LED package including a plurality of LED elements.

BRIEF DESCRIPTION OF THE DRAWINGS

These and other characteristics, features, and advantages of the presently disclosed subject matter will become clear from the following description with reference to the accompanying drawings, wherein.

DETAILED DESCRIPTION OF EXEMPLARY EMBODIMENTS

A description will now be made below to a vehicle light and an LED package of the presently disclosed subject matter with reference to the accompanying drawings in accordance with exemplary embodiments.

Figure 3:
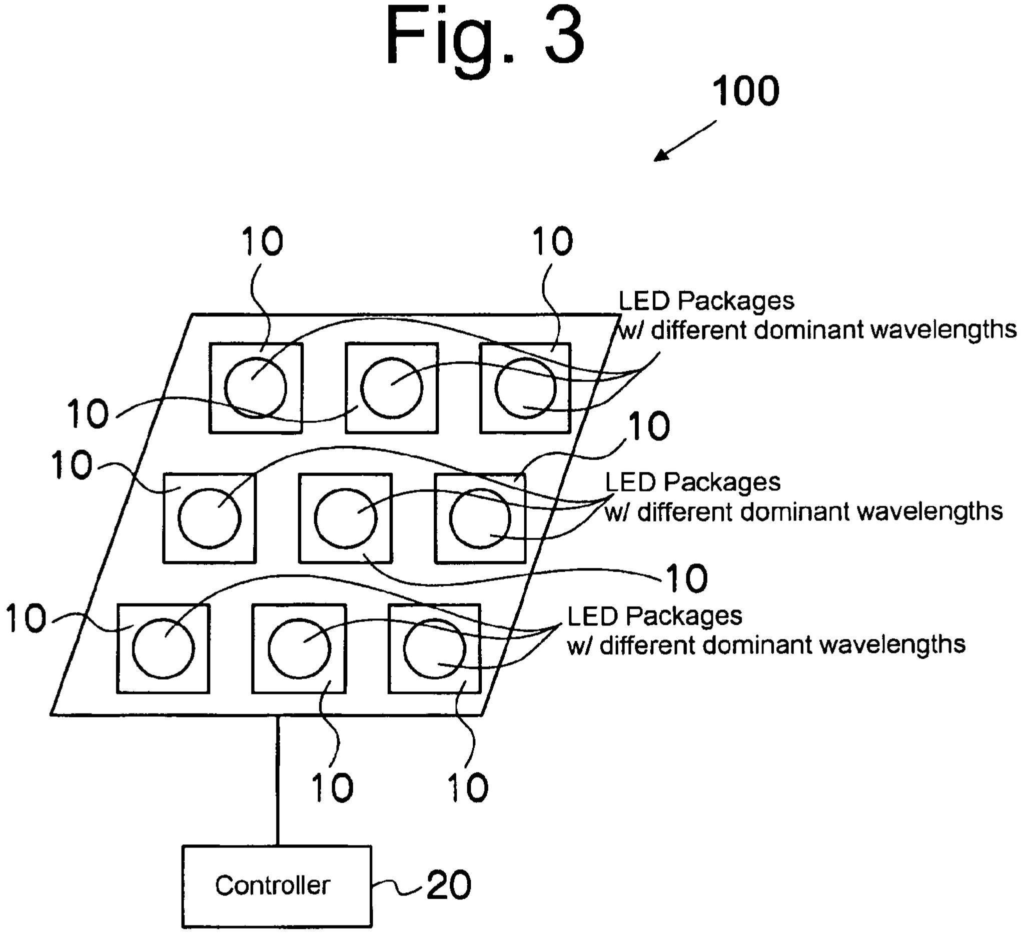
FIG. 3 is a diagram illustrating a configuration of a vehicle light made in accordance with principles of the presently disclosed subject matter.

A first exemplary embodiment will be described with reference to FIG. 3 showing a vehicle light made in accordance with principles of the presently disclosed subject matter.

The vehicle light 100 of the present exemplary embodiment can be provided in the rear part of the vehicle body and can serve as a vehicle signal light or as a vehicle stop lamp. As shown in FIG. 3, the vehicle light 100 can include a plurality of LED light sources 10, and a controller 20 configured to control the respective outputs of the plurality of LED light sources 10.

The plurality of LED light sources 10 can be a plurality of LED packages (or LED chips) each emitting light that has a dominant wavelength (or a peak wavelength) that falls within a specific wavelength range, and the respective dominant wavelengths are different from one another. The specific wavelength range may be a wavelength range of light that is emitted from an incandescent bulb and has passed through a filter with a specific color (for example, a red color filter). An exemplary range may be from 600 nm to 700 nm. Another exemplary range can be from 600 nm to 650 nm, and another exemplary range can be from 610 nm to 630 nm. In the illustrated example, the range may be from 611 nm to 634 nm (red color). The plurality of LED light sources 10 may include a plurality of LED packages (or LED chips) each emitting light that has a different dominant wavelength (or peak wavelength) from each other, but may include the same type LED package(s) (or LED chip(s)) emitting light that has the same dominant wavelength (or peak wavelength).

It should be noted that the "incandescent bulb (or incandescent light)" serving as a comparison basis in the present description is referred to as a white light source having a filament. Examples of such an incandescent bulb includes a light source with a color temperature of 2,856 K of which CIE chromaticity coordinate is not changed in x and/or y directions in an order of 0.010, a light source in accordance with the specification for a filament bulb of ECE No. 37, and the like. Also, note that the "red color filter" serving as a specific color filter used in the present description is referred to as a filter capable of providing a "red color" serving as a functional color for a vehicle light such as a stop lamp. The red color light having passed through the filter can have a half width wider than that of light from an LED element (chip). Any material can be used for the material of the filter as long as the above optical characteristics are satisfied.

Figure 1:
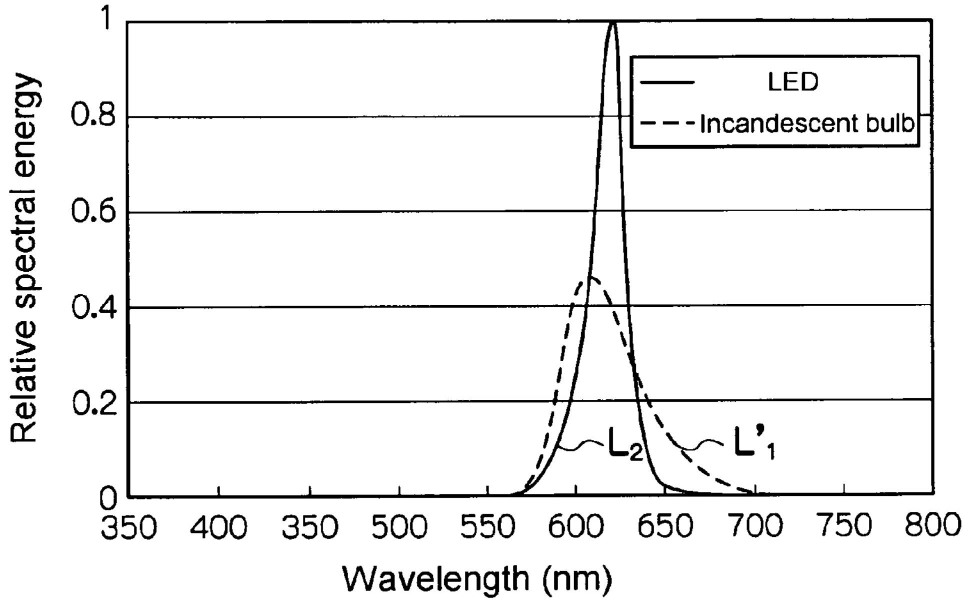
Fig. 1 Conventional Art
FIG. 1 is a spectrum diagram illustrating a conventional LED light source, for explaining a conventional characteristic.
Figure 2:
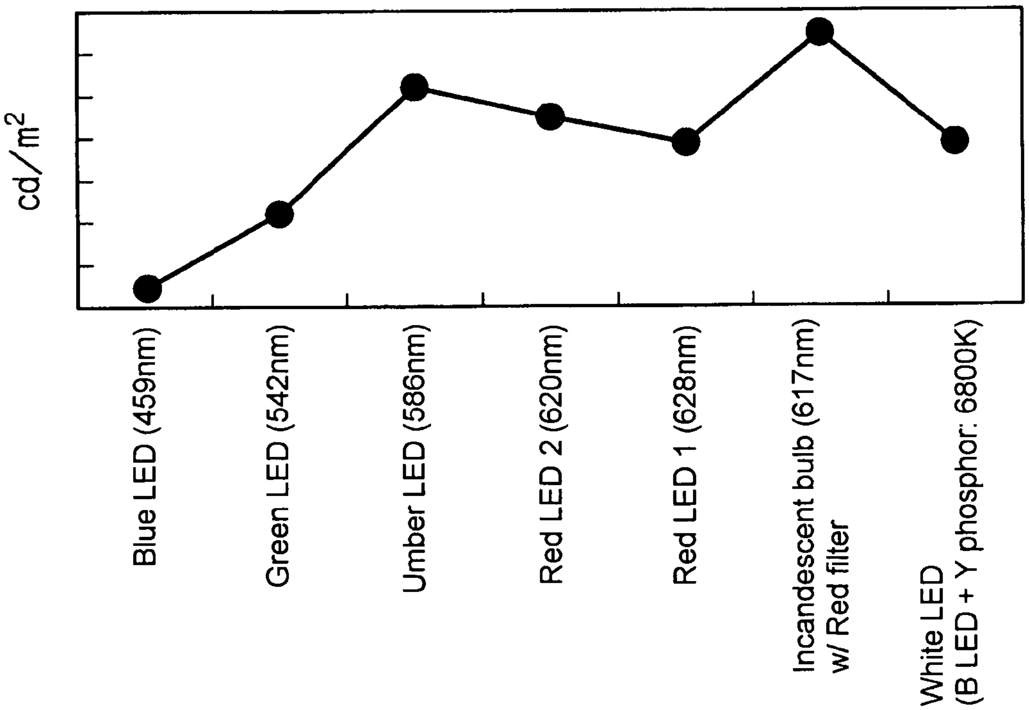
Fig. 2 Conventional Art
FIG. 2 is a graph illustrating respective allowable limits of glaring light intensities for LED light sources and for an incandescent bulb with a red color filter.

The plurality of LED light sources 10 can be arranged in a matrix shape, like as shown in FIG. 1, within a lighting casing for a stop lamp arranged in a rear portion of the vehicle body (not shown).

The controller 20 can be connected to the respective plurality of LED light sources 10. The controller 20 can separately control the outputs of the LED light sources 10 so that the spectral energy characteristics that are derived by multiplying the spectral energy of light emitted from the plurality of LED light sources by the spectral luminous efficacy can be matched to, or approximated to, the spectral energy characteristic that is derived by multiplying the spectral energy of light emitted from an incandescent bulb and passing through a filter with a specified color (for example, a red color filter) by the spectral luminous efficacy. For example, the controller 20 can control the respective LED light sources 10 by adjusting the current values supplied to them.

Figure 4:
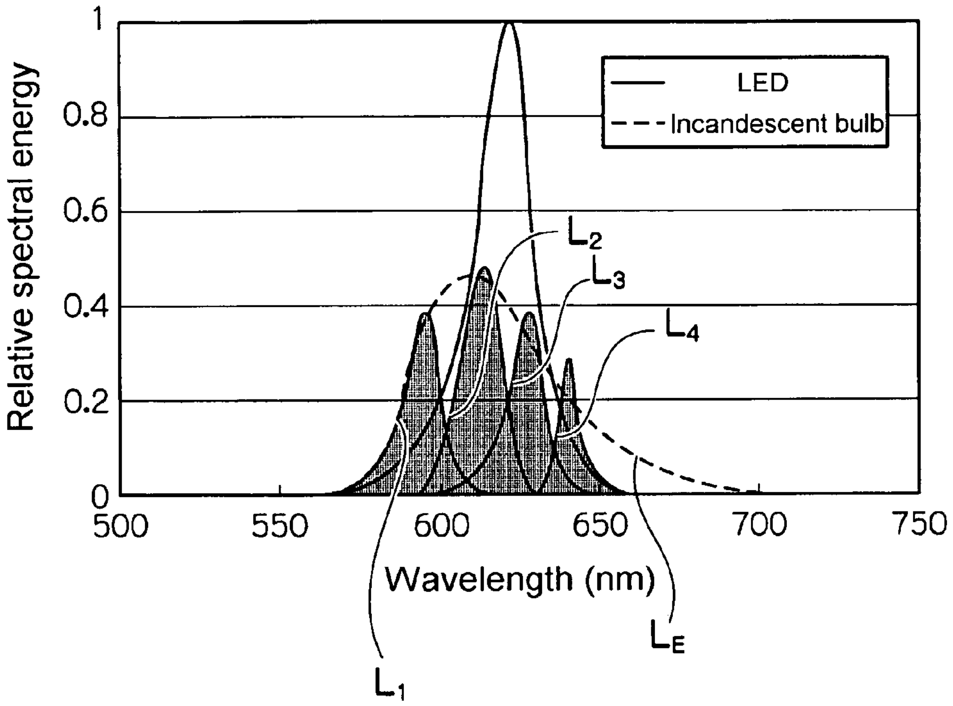
FIG. 4 is a spectrum diagram illustrating respective outputs of light emitted from four LED light sources with dominant wavelengths $f_1$, $f_2$, $f_3$, and $f_4$, the light sources being four out of nine LED light sources of FIG. 3.

FIG. 4 is a spectrum diagram illustrating outputs of light emitted from four LED light sources 10 with respective dominant wavelengths $f_1$, $f_2$, $f_3$, and $f_4$. In FIG. 4, the shown LED light sources 10 can be four LED light sources 10 out of the nine LED light sources 10 of FIG. 3.

As shown in FIG. 4, the controller 20 can control the outputs of four LED light sources 10 (four LED light sources with dominant wavelengths $f_1$, $f_2$, $f_3$, and $f_4$) so as to provide respective spectrum energy characteristics. Namely, the controller 20 can control the four LED light sources 10 to provide respective spectral energy characteristics curves $L_1$, $L_2$, $L_3$, and $L_4$ that are derived by multiplying the spectral energy of light emitted from the four LED light sources 10 by the spectral luminous efficacy. As shown, the curve $L_2$ shows the maximum relative spectral energy among them while the curves $L_1$, $L_3$, and $L_4$ each having a different dominant wavelength from that of $L_2$ each show the lower relative spectral energy. Furthermore, the lower areas of the spectral energy characteristics curves $L_1$, $L_2$, $L_3$, and $L_4$ overlap with the lower areas of the adjacent spectral energy characteristics curves. In this case, the spectral energy characteristics curve $L_2$ showing the maximum energy overlaps with the curve $L_1$ with the shorter dominant wavelength, and the curves cross each other at the point where the energy intensity thereof is 30.6% the maximum energy intensity of the curve $L_2$. Furthermore, the spectral energy characteristics curve $L_2$ overlaps with the curve $L_3$ with the longer dominant wavelength, and the curves cross each other at the point where the energy intensity thereof is 41.6% the maximum energy intensity of the curve $L_2$.

As shown, it is possible that the adjacent spectral energy characteristics curves with different dominant wavelengths cross each other at the point where the energy intensity is 50%, or less, of the higher maximum energy intensity. In this manner wherein the respective lower areas of the curves overlap each other, the resulting light from the vehicle light can have the same level of glare as that of light from an incandescent bulb with a specified filter.

In this way, the vehicle light 100 of the presently disclosed subject matter can achieve the spectral energy characteristics that is matched to or be approximated to the spectral energy characteristic $L_E$ that is derived by multiplying the spectral energy of light emitted from an incandescent bulb and passing through a filter with a specified color (for example, a red color filter) by the spectral luminous efficacy.

Accordingly, the vehicle light 100 of the presently disclosed subject matter can reproduce the same spectrum as that of the conventional incandescent bulb by means of the plurality of LED light sources 10 (four in the illustrated example of FIG. 4). This configuration can achieve a vehicle light, which even uses a plurality of LED light sources, capable of preventing or suppressing the emission of glaring light more than the conventional vehicle light that uses a plurality of LED light sources, each emitting light with the same dominant wavelength. Accordingly, the presently disclosed subject matter can provide a vehicle light suitable for a stop lamp of a vehicle light.

It should be noted that in the presently disclosed subject matter the term "peak wavelength" is used to mean the wavelength at which the luminous intensity of an LED light source is a maximum. Furthermore, the term "dominant wavelength" is used to mean the wavelength of the color at which a person can sense from the light and it is a single wavelength determined by plotting the color in a color chromaticity diagram to determine it as a pure monochromatic light color. The sensitivity of the human eye has a wavelength dependency, and therefore the peak wavelength of light from an LED light source is different from the wavelength of color that a human actually senses. For this reason, the "dominant wavelength" should be used.

A description will now be given of an LED package 200 in accordance with the second exemplary embodiment with reference to the figures.

Figure 5A:
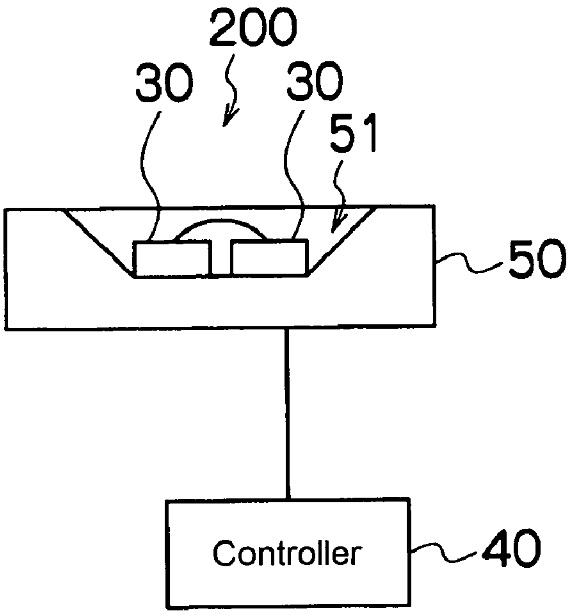
FIGS. 5A and 5B are diagrams illustrating an LED package made in accordance with principles of the presently disclosed subject matter.
Figure 5B:
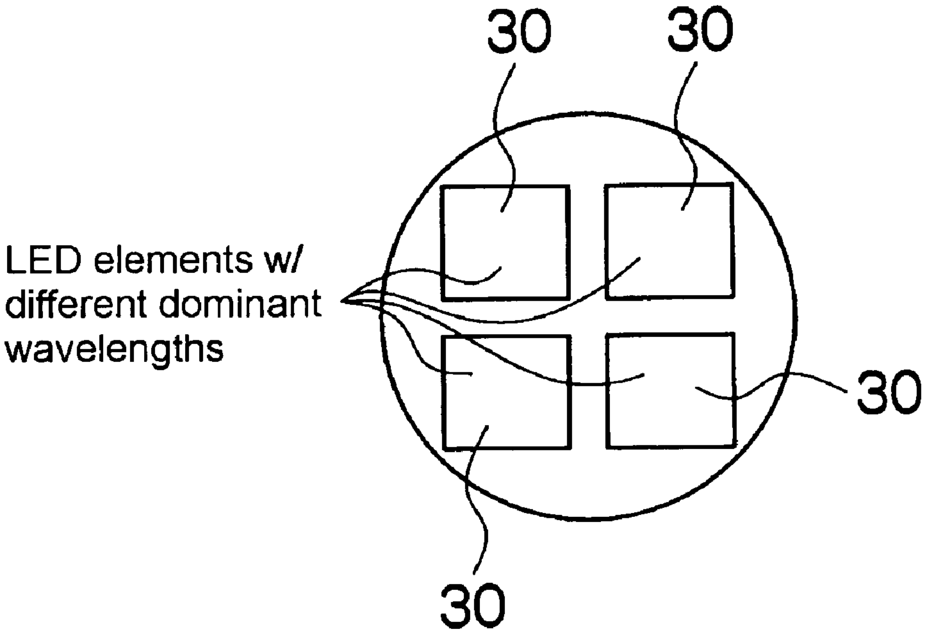

FIGS. 5A and 5B are diagrams illustrating the LED package made of the second exemplary embodiment.

The LED package 200 of the present exemplary embodiment can be applied to a vehicle signal light such as a stop lamp provided in the rear part of a vehicle body, an illumination lamp for use in entertainment equipment, etc. As shown in FIGS. 5A and 5B, the LED package 200 can include a plurality of LED elements 30, a controller 40 configured to control the respective outputs of the plurality of LED elements 30, a package body 50, and the like.

The plurality of LED elements 30 can be a plurality of LED elements (or LED chips) each emitting light that has a dominant wavelength (or a peak wavelength) that falls within a specific wavelength range, and the respective dominant wavelengths are different from one another. The specific wavelength range may be a wavelength range of light that is emitted from an incandescent bulb and which has passed through a filter with a specific color (for example, a red color filter). An exemplary range may be from 611 nm to 634 nm (red color). The plurality of LED elements 10 may include a plurality of LED elements (or LED chips) each emitting light that has a different dominant wavelength (or peak wavelength) from each other, but may include the same type LED element(s) (or LED chip(s)) emitting light that has the same dominant wavelength (or peak wavelength).

The plurality of LED elements 30 can be arranged in a matrix shape, like as shown in FIG. 5A, adjacent to or on the bottom of a recessed portion 51 of the package body 50.

The controller 40 can be connected to the respective plurality of LED elements 30. The controller 40 can separately control the outputs of the LED elements 30 so that the spectral energy characteristics that are derived by multiplying the spectral energy of light emitted from the plurality of LED elements by the spectral luminous efficacy can be matched to, or approximated to, the spectral energy characteristic that is derived by multiplying the spectral energy of light emitted from an incandescent bulb and passing through a filter with a specified color (for example, a red color filter) by the spectral luminous efficacy. For example, the controller 40 can control the respective LED elements 30 by adjusting the current values supplied to them.

FIG. 4 also represents a spectrum diagram illustrating outputs of light emitted from four LED elements 30 with respective dominant wavelengths $f_1$, $f_2$, $f_3$, and $f_4$. In FIG. 4, the shown LED elements 30 can be four LED elements out of the nine LED elements 30 of FIG. 5A.

As shown in FIG. 4, the controller 40 can control the outputs of four LED elements 30 so as to make them to provide respective spectrum energy characteristics $L_1$, $L_2$, $L_3$, and $L_4$ that are derived by multiplying the spectral energy of light emitted from the four LED elements 30 by the spectral luminous efficacy. In this way, the LED package 200 of the presently disclosed subject matter can achieve the spectral energy characteristics that is matched to or be approximated to the spectral energy characteristic $L_E$ that is derived by multiplying the spectral energy of light emitted from an incandescent bulb and passing through a filter with a specified color (for example, a red color filter) by the spectral luminous efficacy.

Accordingly, the LED package 200 of the presently disclosed subject matter can reproduce the same spectrum as that of the conventional incandescent bulb by means of the plurality of LED elements 30 (four in the illustrated example of FIGS. 5A and 5B). This configuration can achieve an LED package, which even uses a plurality of LED elements, capable of preventing or suppressing the emission of glaring light more than the conventional LED package including a plurality of LED elements emitting light of which dominant wavelengths are the same.

A description will now be given of modified examples.

Figure 6:
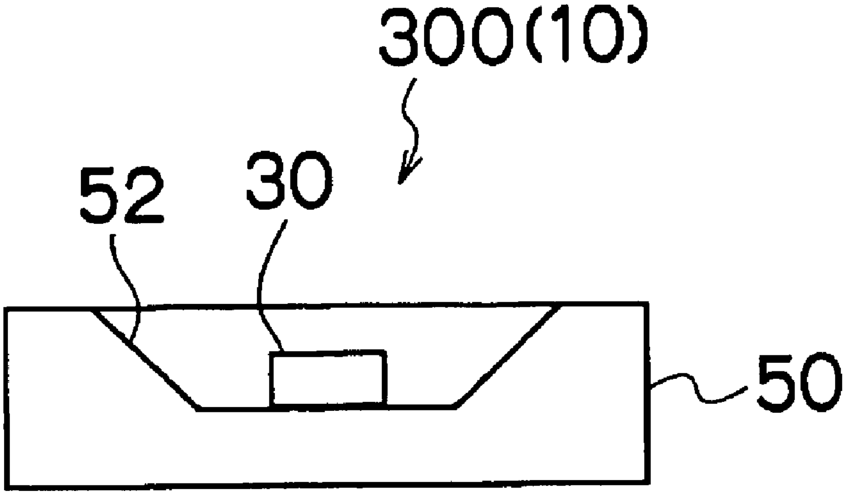
FIG. 6 is a schematic diagram illustrating a modified example of an LED package utilized as one of the plurality of LED light sources.

The vehicle light 100 in the first exemplary embodiment can be designed to have an optical system (light distribution design) that can depend only on the direct light from the plurality of LED light sources 10. The presently disclosed subject matter is not limited to this embodiment. For example, the vehicle light can be modified to include an optical system that also utilizes indirect light from the plurality of LED light sources 10 in order to unify the illumination light. In this case, a reflector 52 or the like can be used for this purpose in one LED package 300 or LED light source 10 of the vehicle light as shown in FIG. 6. The reflector 52 can be formed in any known manner. Accordingly, the vehicle light of this modified example can have a reflector configured to reflect light emitted from the plurality of LED light sources in order to uniformly emit the light, thereby preventing or suppressing the emission of glaring light more effectively than the conventional vehicle light.

Figure 7:
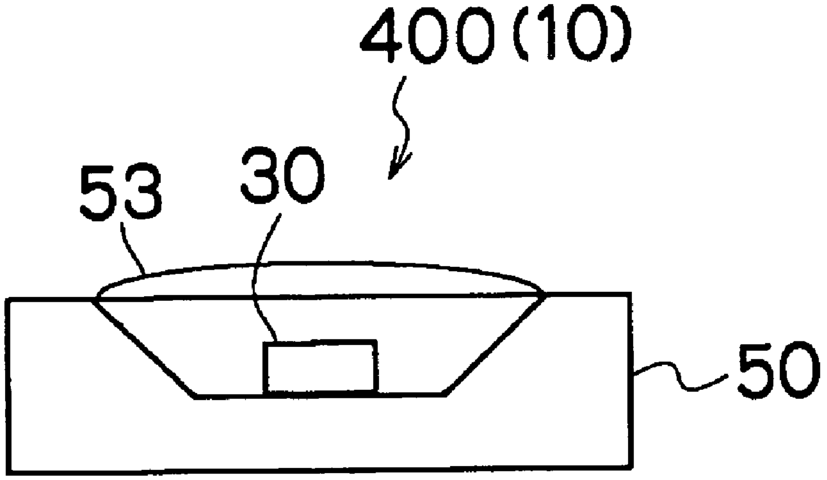
FIG. 7 is a schematic diagram illustrating another modified example of an LED package utilized as one of the plurality of LED light sources.

When such an optical system depending only on direct light from the LED light sources 10 is used, the vehicle light can be modified to include a lens for diffusing light for optical control. In this case, an inner lens 53 or the like can be used in a single LED package 400 or a single LED light source 10 of the vehicle light as shown in FIG. 7. The inner lens 53 can be formed in any known manner. Accordingly, the vehicle light of this modified example can have the lens, thereby preventing or suppressing the emission of glaring light more effectively than the conventional vehicle light.

Also, when such an optical system depending only on direct light from the LED light sources 10 is used, the vehicle light can be modified such that the plurality of LED light sources 10 are arranged at wider regular intervals, for example, 15 mm or less, thereby preventing or suppressing the emission of glaring light more effectively than the conventional vehicle light.

In the above-described exemplary embodiments, a red filter color is disclosed by way of example only, and the presently disclosed subject matter is not limited thereto. For example, the color can be amber which can be utilizes as a color for a director indication lamp, or other colors. In particular, the wavelength range of light in which the mutually different wavelength light sources exist can also be the yellow-orange light range (i.e., between 577 nm and 622 nm wavelength), the green light range (between 492 nm and 577 nm wavelength), the blue light range (between 455 nm and 492 nm wavelength), and other substantially single color ranges.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A vehicle light comprising a plurality of LED light sources including at least two LED light sources having mutually different dominant wavelengths that fall within a predetermined wavelength range of light, and a controller configured to control respective outputs of the plurality of LED light sources;

wherein the predetermined wavelength range of light is located within a wavelength range for light emitted from a white light source using a filament and wavelength converted by passing through a color filter;

wherein the predetermined wavelength range converted by the color filter is from 600 nm to 700 nm;

wherein the controller controls the outputs of the plurality of LED light sources by matching spectral energy characteristics associated with each of the plurality of LED light sources to a predetermined spectral energy characteristic; and wherein the spectral energy characteristics are derived by multiplying a spectral energy of the light emitted from respective ones of the plurality of LED light sources by a spectral luminous efficacy and the predetermined spectral energy characteristic is derived by multiplying a spectral energy of light emitted from the white light source and wavelength converted by the filter by the spectral luminous efficacy.

2. The vehicle light according to claim 1, wherein the plurality of LED light sources are arranged at regular intervals of 15 mm or less.

3. The vehicle light according to claim 1, wherein each of the plurality of LED light sources has a reflector configured to reflect the light emitted from a respective one of the plurality of LED light sources in a uniform pattern.

4. The vehicle light according to claim 3, wherein each of the LED light sources has a lens configured to diffuse at least part of the light emitted from a respective one of the plurality of LED light sources.

5. The vehicle light according to claim 4, wherein the plurality of LED light sources define at least a portion of one of a stop light and a direction indicator light for a vehicle.

6. An LED package comprising a plurality of LED light sources including at least two LED light sources having mutually different dominant wavelengths that fall within a predetermined wavelength range of light, and a controller configured to control respective outputs of the plurality of LED light sources;

wherein the predetermined wavelength range of light is located within a wavelength range for light emitted from a white light source using a filament and wavelength converted by passing through a color filter;

wherein the predetermined wavelength range converted by the color filter is from 600 nm to 700 nm;

wherein the controller controls the outputs of the plurality of LED light sources by matching spectral energy characteristics associated with each of the plurality of LED light sources to a predetermined spectral energy characteristic; and wherein the spectral energy characteristics are derived by multiplying a spectral energy of the light emitted from respective ones of the plurality of LED light sources by a spectral luminous efficacy and the predetermined spectral energy characteristic is derived by multiplying a spectral energy of light emitted from the white light source and wavelength converted by the filter by the spectral luminous efficacy.

7. A vehicle light comprising a plurality of LED light sources, each of the LED light sources emitting light having a dominant wavelength that falls within a predetermined wavelength range of light, and a controller configured to control respective outputs of the plurality of LED light sources;

wherein the predetermined wavelength range is located within a wavelength range for light that is emitted from an incandescent bulb and which has passed through a filter with a specified color;

wherein each of the dominant wavelengths is different from another one of the dominant wavelengths;

wherein the predetermined wavelength range converted by the color filter is from 600 nm to 700 nm;

wherein the controller controls the outputs of the plurality of LED light sources by matching spectral energy characteristics associated with each of the plurality of LED light sources to a predetermined spectral energy characteristic; and wherein the spectral energy characteristics are derived by multiplying a spectral energy of the light emitted from respective ones of the plurality of LED light sources by a spectral luminous efficacy and the predetermined spectral energy characteristic is derived by multiplying a spectral energy of light emitted from the incandescent bulb and wavelength converted by the filter by the spectral luminous efficacy.

8. The vehicle light according to claim 7, wherein the plurality of LED light sources are arranged at regular intervals of 15 mm or less.

9. The vehicle light according to claim 7, wherein each of the plurality of LED light sources has a reflector configured to reflect the light emitted from a respective one of the plurality of LED light sources in a uniform pattern.

10. The vehicle light according to claim 9, wherein each of the LED light sources has a lens configured to diffuse at least part of the light emitted from a respective one of the plurality of LED light sources.

11. An LED package comprising a plurality of LED light sources, each of the plurality of LED light sources emitting light having a dominant wavelength that falls within a predetermined wavelength range of light, and a controller configured to control respective outputs of the plurality of LED light sources;

wherein the predetermined wavelength range of light is located within a wavelength range for light that is emitted from an incandescent bulb and which has passed through a filter with a specified color;

wherein each of the dominant wavelengths is different from another one of the dominant wavelengths;

wherein the predetermined wavelength range converted by the color filter is from 600 nm to 700 nm;

wherein the controller controls the outputs of the plurality of LED light sources by matching spectral energy characteristics associated with each of the plurality of LED light sources to a predetermined spectral energy characteristic; and wherein the spectral energy characteristics are derived by multiplying a spectral energy of the light emitted from respective ones of the plurality of LED light sources by a spectral luminous efficacy and the predetermined spectral energy characteristic is derived by multiplying a spectral energy of light emitted from the incandescent bulb and wavelength converted by the filter by the spectral luminous efficacy.

12. A vehicle light comprising a plurality of LED light sources including at least two LED light sources having mutually different dominant wavelengths that fall within a predetermined wavelength range of light, and a controller configured to control respective outputs of the plurality of LED light sources;

wherein the predetermined wavelength range of light is located within a wavelength range for light emitted from a white light source and which has passed through a filter;

wherein one of the two LED light sources with the mutually different dominant wavelengths has a high relative spectral energy distribution with a maximum energy intensity, and another one of the two LED light sources has a low relative spectral energy distribution that overlaps with the high relative spectral energy distribution crossing at a point where an energy intensity of the another one of the two LED light sources is less than or substantially equal to 50% of the maximum energy intensity;

wherein the controller controls the outputs of the plurality of LED light sources by matching spectral energy characteristics associated with each of the plurality of LED light sources to a predetermined spectral energy characteristic; and wherein the spectral energy characteristics are derived by multiplying a spectral energy of the light emitted from respective ones of the plurality of LED light sources by a spectral luminous efficacy and the predetermined spectral energy characteristic is derived by multiplying a spectral energy of light emitted from the white light source and wavelength converted by the filter by the spectral luminous efficacy.

13. The vehicle light according to claim 7, wherein each of the plurality of LED light sources has a reflector configured to reflect the light emitted from a respective one of the plurality of LED light sources in a uniform pattern.

14. The vehicle light according to claim 7, wherein each of the LED light sources has a lens configured to diffuse at least part of the light emitted from a respective one of the plurality of LED light sources.

15. The vehicle light according to claim 1, wherein each of the plurality of LED light sources has a reflector configured to reflect the light emitted from a respective one of the plurality of LED light sources in a uniform pattern.

16. The vehicle light according to claim 1, wherein each of the LED light sources has a lens configured to diffuse at least part of the light emitted from a respective one of the plurality of LED light sources.

* * * * *